(12) United States Patent
Koyama et al.

(10) Patent No.: US 7,476,695 B2
(45) Date of Patent: Jan. 13, 2009

(54) MODIFIED STANNIC OXIDE-ZIRCONIUM OXIDE COMPLEX SOL AND METHOD FOR PREPARING SAME

(75) Inventors: Yoshinari Koyama, Sodegaura (JP); Motoko Asada, Sodegaura (JP)

(73) Assignee: Nissan Chemical Industries, Ltd., Tokyo (JP)

( * ) Notice: Subject to any disclaimer, the term of this patent is extended or adjusted under 35 U.S.C. 154(b) by 457 days.

(21) Appl. No.: 11/074,659

(22) Filed: Mar. 9, 2005

(65) Prior Publication Data

US 2005/0209346 A1    Sep. 22, 2005

(30) Foreign Application Priority Data

Mar. 16, 2004    (JP) .............................. 2004-074586

(51) Int. Cl.
  *B01F 3/12* (2006.01)
  *B01F 17/00* (2006.01)
(52) U.S. Cl. ............................. 516/88; 516/90; 516/92; 516/922; 516/928; 977/775; 977/777; 977/886
(58) Field of Classification Search ................... 516/88, 516/90, 92, 922, 928; 977/775, 777, 886
  See application file for complete search history.

(56) References Cited

U.S. PATENT DOCUMENTS 4,017,418 A * 4/1977 Crompton et al. ........... 252/609
5,460,738 A * 10/1995 Watanabe et al. ............. 516/90
6,296,943 B1 * 10/2001 Watanabe et al. ........... 428/447
6,355,694 B1 * 3/2002 Suzuki et al. ................. 516/90
6,626,987 B1 * 9/2003 Suzuki et al. .......... 106/287.14

FOREIGN PATENT DOCUMENTS

| EP | 0 582 386 A1 | 2/1994 |
|---|---|---|
| EP | 1 041 040 A2 | 10/2000 |
| JP | 50-40119 | 4/1975 |
| JP | A 54-52686 | 4/1979 |
| JP | A 63-37142 | 2/1988 |
| JP | A 64-27635 | 1/1989 |
| JP | A 3-217230 | 9/1991 |
| JP | A 6-24746 | 2/1994 |
| JP | A 2000-281344 | 10/2000 |

* cited by examiner

*Primary Examiner*—Timothy J. Kugel
(74) *Attorney, Agent, or Firm*—Oliff & Berridge, PLC

(57) ABSTRACT

There is provided a stable sol comprising modified stannic oxide-zirconium oxide complex colloidal particles, wherein the particles are formed by coating as nuclei stannic oxide-zirconium oxide complex colloidal particles in which stannic oxide colloidal particles obtained by a reaction of metal tin, an organic acid and hydrogen peroxide is bonded to zirconium oxide colloidal particles with tungsten oxide-stannic oxide-silicon dioxide complex colloidal particles. The sol has a high refractive index and is improved in water resistance, moisture resistance and weather resistance, and can be used by mixing with a hard coating paint as a component for improving properties of a hard coating film applied on a plastic lens surface.

2 Claims, No Drawings

MODIFIED STANNIC OXIDE-ZIRCONIUM OXIDE COMPLEX SOL AND METHOD FOR PREPARING SAME

BACKGROUND OF THE INVENTION

1. Field of the Invention

The present invention relates to a method for preparing modified stannic oxide-zirconium oxide colloidal particles having a particle diameter of 4.5-60 nm which is formed by coating stannic oxide-zirconium oxide complex colloidal particles prepared by use of stannic oxide colloidal particles having a particle diameter of 4-50 nm obtained by reacting hydrogen peroxide solution and metal tin in an organic acid aqueous solution, preferably oxalic acid aqueous solution in such a manner that $H_2O_2/Sn$ molar ratio is maintained at 2-10, preferably 2-4 and the concentration of tin oxides is 40% by weight or less with tungsten oxide-stannic oxide-silicon dioxide complex colloidal particles having a particle diameter of 2-7 nm.

The sol according to the present invention is used as a component of hard coating agent applied on a plastic lens surface and also for other various applications.

2. Description of the Related Art

A variety of metal oxide sols are already known.

There have been used sols of metal oxides having a high refractive index as a component of a hard coating agent applied on a plastic lens surface which is recently used much in order to improve the surface.

For example, a hard coating agent containing particles of metal oxides such as Al, Ti, Zr, Sn and Sb, etc. having a size of 1-300 nm is described in Japanese Patent Publication No. Sho 63-37142.

Although a stable sol of tungsten oxide alone is not known yet, Japanese Patent Laid-Open No. Sho 54-52686 proposes a sol obtained by addition of silicate in which a $WO_3$:$SiO_2$:$M_2O$ molar ratio (wherein, M represents alkali metal atom or ammonium group) is 4-15:2-5:1.

A silicate-stannate complex sol in which a molar ratio of Si:Sn is 2-1000:1 has been proposed in Japanese Patent Publication No. Sho 50-40119.

Japanese Patent Application Laid-Open No. Hei 3-217230 proposes a stable sol comprising a modified metal oxide colloid having a particle diameter of 4.5-60 nm and which is formed by coating colloidal particulate surfaces of metal oxide having a particle diameter of 4-50 nm and a valence of 3, 4 or 5 as nuclei with colloidal particles of a tungsten oxide-stannic oxide complex having a $WO_3/SnO_2$ weight ratio of 0.5-100 and a particle diameter of 2-7 nm, wherein the stable sol contains total metal oxides in an amount of 2-50% by weight.

Japanese Patent Laid-Open No. Hei 6-24746 proposes a stable sol of a modified $SnO_2$—$ZrO_2$ complex which comprises particles formed by coating surfaces of colloidal particle of metal oxide having a $ZrO_2/SnO_2$ weight ratio of 0.02-1.0 and a particle diameter of 4-50 nm as nuclei with colloidal particles of a $WO_3$—$SnO_2$ complex having a $WO_3/SnO_2$ weight ratio of 0.5-100 and a particle diameter of 2-7 nm.

In addition, Japanese Patent Laid-Open No. 2000-281344 discloses a stable sol which comprises modified stannic oxide-zirconium oxide complex colloidal particles having a particle diameter of 4.5-60 nm, wherein the particles are formed by coating surfaces of stannic oxide-zirconium oxide complex colloidal particles having a bonded structure of stannic oxide colloidal particles with zirconium oxide colloidal particles at a $ZrO_2/SnO_2$ ratio of 0.02-1.0 based on weights of these oxides and having a particle diameter of 4-50 nm as nuclei, with tungsten oxide-stannic oxide-silicon dioxide complex colloidal particles having a $WO_3/SnO_2$ weight ratio of 0.1-100, a $SiO_2/SnO_2$ weight ratio of 0.1-100 and a particle diameter of 2-7 nm, and wherein the sol contains total metal oxides in an amount of 2-50% by weight.

When these conventional metal oxide sols, particularly cationic metal oxide sols are used as a component of a hard coating agent, the stability of the obtained hard coating agent is insufficient and also transparency, adhesion, weather resistance, etc. of a hardened coating coated with the hard coating agent are insufficient. Further, if an $Sb_2O_5$ sol is used as a component of a hard coating agent, the $Sb_2O_5$ sol can no longer improve a refractive index of the hardened coating sufficiently when a refractive index of a plastic substrate in a lens is 1.6 or more, since a refractive index of $Sb_2O_5$ is about 1.65-1.70.

The silicate-stannate complex sol described in the above-mentioned Japanese Patent Publication No. Sho 50-40119 is obtained by decationizing a mixed aqueous solution of an alkali silicate and an alkali stannate, but an effect for improving a refractive index of a coating is also low in the case of use as a component of a hard coating agent as described above.

The sol of tungsten oxide described in the above-mentioned Japanese Patent Laid-Open No. Sho 54-52686 is obtained by adding a silicate to a tungstate aqueous solution which is obtained by decationizing a tungstate aqueous solution, but it is stable only at a strong acidic state and an effect for improving a refractive index of a coating is low in the case of use as a component of a hard coating agent.

The modified metal oxide sol described in the above-mentioned Japanese Patent Laid-Open No. Hei 3-217230 having a refractive index of 1.7 or more is stable, thus it can be used as a component of a hard coating agent for a plastic lens and it can satisfy almost all properties required for a hard coating such as damage resistance, transparency, adhesion, water resistance, weather resistance, etc. However, in case where a base material of lens has a refractive index of 1.7 or more, the refractive index of cured coating is no longer improved sufficiently.

The modified stannic oxide-zirconium oxide sol described in the above-mentioned Japanese Patent Laid-Open No. Hei 6-24746 having a refractive index of 1.7 or more is stable, thus it can be used as a component of a hard coating agent for a plastic lens, and it can satisfy almost all properties required for a hard coating such as damage resistance, transparency, adhesion, etc. However, in case where a base material of lens has a refractive index of 1.7 or more, it is desired that physical properties of the applied coating are further improved.

The modified stannic oxide-zirconium oxide sol described in the above-mentioned Japanese Patent Laid-Open No. 2000-281344 having a refractive index of 1.7 or more is stable, thus it can be used as a component of a hard coating agent for a plastic lens and it can overcome problems found when the conventional metal oxide sols are used, such as yellowing due to ultraviolet radiation, low water resistance, low moisture resistance and low weather resistance, and further it can satisfy almost all properties required for a hard coating such as damage resistance, transparency, adhesion, etc. However, in case where a base material of lens has a refractive index of 1.7 or more, it is desired that physical properties of the applied coating are further improved.

SUMMARY OF THE INVENTION

A modified metal oxide sol according to the present invention provides a stable sol of modified stannic oxide-zirconium oxide complex colloidal particles having good water resistance, moisture resistance, weather resistance and a high refractive index which overcomes yellowing due to ultraviolet radiation found when the conventional metal oxide sols are used and also overcomes such problems as low water resistance and moisture resistance, and thus it provides a metal oxide sol which can be used by mixing with a hard coating paint as a component for improving properties of the hard coating applied on a plastic lens surface.

The present invention relates to the following aspects:

as a first aspect, a stable sol which comprises modified stannic oxide-zirconium oxide complex colloidal particles having a particle diameter of 4.5-60 nm, wherein the particles are formed by coating surfaces of stannic oxide-zirconium oxide complex colloidal particles having a bonded structure of stannic oxide colloidal particles obtained by a reaction of metal tin, an organic acid and hydrogen peroxide with zirconium oxide colloidal particles at a $ZrO_2/SnO_2$ ratio of 0.02-1.0 based on weights of these oxides and having a particle diameter of 4-50 nm as nuclei, with tungsten oxide-stannic oxide-silicon dioxide complex colloidal particles having a $WO_3/SnO_2$ weight ratio of 0.1-100, a $SiO_2/SnO_2$ weight ratio of 0.1-100 and a particle diameter of 2-7 nm, and wherein the sol contains total metal oxides in an amount of 2-60% by weight;

as a second aspect, the stable sol as set forth in the first aspect, wherein the organic acid is oxalic acid or an organic acid containing oxalic acid as a main component;

as a third aspect, a method for preparing the stable sol of modified stannic oxide-zirconium oxide complex colloidal particles as set forth in the first or second aspect, comprising the steps of:

(a) forming stannic oxide colloidal particles having a particle diameter of 4-50 nm by reacting hydrogen peroxide solution with metal tin in an organic acid aqueous solution in such a manner that a molar ratio of $H_2O_2/Sn$ is maintained within a range of 2-4 and a concentration of tin oxides is 40% by weight or less;

(b) mixing a stannic oxide aqueous sol which contains the stannic oxide colloidal particles having a particle diameter of 4-50 nm obtained in step (a) at a concentration of 0.5-50% by weight calculated as $SnO_2$, with an oxyzirconium salt aqueous solution having a concentration of 0.5-50% by weight calculated as $ZrO_2$, at a weight ratio of $ZrO_2/SnO_2$ of 0.02-1.0;

(c) forming a stannic oxide-zirconium oxide complex aqueous sol having a particle diameter of 4-50 nm by heating the mixed solution obtained in step (b) at 60-200° C. for 0.1-50 hours;

(d) forming a tungsten oxide-stannic oxide-silicon dioxide complex sol by preparing an aqueous solution containing tungstate, stannate and silicate in a $WO_3/SnO_2$ weight ratio of 0.1-100 and a $SiO_2/SnO_2$ weight ratio of 0.1-100 and removing cations present in the aqueous solution;

(e) mixing 100 parts by weight, calculated as the total of $ZrO_2$ and $SnO_2$ contained, of the stannic oxide-zirconium oxide complex aqueous sol obtained in step (c) with 2-100 parts by weight, calculated as total of $WO_3$, $SnO_2$ and $SiO_2$ contained, of the tungsten oxide-stannic oxide-silicon dioxide complex sol obtained in step (d) having a particle diameter of 2-7 nm, a $WO_3/SnO_2$ weight ratio of 0.1-100 and a $SiO_2/SnO_2$ weight ratio of 0.1-100 at 0-100° C.; and (f) removing anions present in the modified stannic oxide-zirconium oxide complex aqueous sol obtained in step (e) by bringing the sol into contact with an anion exchanger; and as a forth aspect, the method for preparing the stable sol as set forth in the third aspect, wherein the organic acid aqueous solution is an oxalic acid aqueous solution or an organic acid aqueous solution containing oxalic acid as a main component.

The sol obtained according to the present invention of stannic oxide-zirconium oxide complex colloidal particles modified at their surfaces with tungsten oxide-stannic oxide-silicon dioxide complex colloidal particles shows colloidal color, and the dried coating thereof exhibits a high refractive index of about 1.8 or more and has good water resistance, moisture resistance, light resistance, anti-static property, heat resistance, wear resistance and the like.

The sol of modified stannic oxide-zirconium oxide complex colloidal particles obtained according to the conventional method contains particles of spindle form therein, and thus it was difficult for these particles to be stably present in a high concentration. On the contrary, the sol of the modified stannic oxide-zirconium oxide complex colloidal particles according to the present invention has spherical particle shape, and thus it is able to be stably present even in a high concentration.

For example, the sol of modified stannic oxide-zirconium oxide complex colloidal particles obtained according to the conventional method has a viscosity of 15 c.p. (15 mPa·s) when it is measured in a 100 cc measuring cylinder in a particle concentration of 47.0% by weight with B-type viscometer using No. 1 rotor at 60 rpm.

On the other hand, the sol of modified stannic oxide-zirconium oxide complex colloidal particles according to the present invention has a viscosity of 5.5 c.p. (5.5 mPa·s) when it is measured in a 100 cc measuring cylinder in a particle concentration of 47.4% by weight with B-type viscometer using No. 1 rotor at 60 rpm.

Consequently, as the sol of the present invention can be used as a suitable coating agent in a higher concentration relative to the conventional product, a plenty of particles are present in a coating film, and it has good wear resistance, moisture resistance, light resistance, anti-static property, heat resistance and wear resistance, etc.

In addition, particularly, the coating film obtained from the sol of modified stannic oxide-zirconium oxide complex colloidal particles according to the present invention is outstandingly improved in film hardness compared with the conventional one. It is assumed that the sol of the present invention has spherical particle shape in contrast to the spindle shape of the conventional product, and therefore the former is improved in packing ability of particles in the coating film.

The sol is stable at pH of about 1-10, so that it can provide sufficient stability to be supplied as an industrial material.

The sol has good compatibility with a sol comprising other negatively charged colloidal particles, since colloidal particles thereof are negatively charged, thus it can be mixed stably with a dispersion such as silica sol, an diantimony pentaoxide sol, anionic or nonionic surfactants, a aqueous solution of polyvinyl alcohol, etc., anionic or nonionic resinous emulsions, water glass, an aqueous solution of aluminum phosphate, etc., a hydrolysate solution of ethyl silicate and a hydrolysate solution of silane coupling agent such as γ-glycidoxy propyl trimethoxy silane, etc.

The sol according to the present invention having such properties is effective particularly as a component to improve a refractive index, dyeability, chemical resistance, water resistance, moisture resistance, light resistance, weather resistance, wear resistance, etc. for forming a hard coating on a plastic lens. In addition, it can be used for other various applications.

By applying the sol on surfaces of organic fibers, fibrous products, paper and the like, flame retardant property, surface slide inhibiting property, anti-static property, dyeability and the like of these materials can be improved. Further, the sol can be used as a binder for ceramic fibers, glass fibers, ceramics, etc. In addition, by using with mixture into various paints, various adhesives, etc., water resistance, chemical resistance, light resistance, weather resistance, wear resistance, flame retardant property, etc. the hard coating can be improved. Still further, the sol can be generally used as a surface treating agent for metallic materials, ceramic materials, glass materials, plastic materials and the like. Further, it is also useful as a catalytic component.

DETAILED DESCRIPTION OF THE PREFERRED EMBODIMENTS

The present invention relates to a stable sol which comprises modified stannic oxide-zirconium oxide complex colloidal particles having a particle diameter of 4.5-60 nm, wherein the particles are formed by coating surfaces of stannic oxide-zirconium oxide complex colloidal particles having a bonded structure of stannic oxide colloidal particles obtained by a reaction of metal tin, an organic acid and hydrogen peroxide with zirconium oxide colloidal particles at a $ZrO_2/SnO_2$ ratio of 0.02-1.0 based on weights of these oxides and having a particle diameter of 4-50 nm as nuclei, with tungsten oxide-stannic oxide-silicon dioxide complex colloidal particles having a $WO_3/SnO_2$ weight ratio of 0.1-100, a $SiO_2/SnO_2$ weight ratio of 0.1-100 and a particle diameter of 2-7 nm, and wherein the sol contains total metal oxides in an amount of 2-60% by weight. Stannic oxide as starting material in this sol is prepared by using an organic acid which is preferably oxalic acid or an organic acid containing oxalic acid as a main component. More preferably, it is prepared by use of only oxalic acid as an organic acid.

The organic acid containing oxalic acid as a main component is an organic acid containing oxalic acid in an amount of 80% by weight or more in total organic acids, and residual components may be organic acids such as formic acid, acetic acid, etc.

The sol of the stannic oxide-zirconium oxide complex colloidal particles used in the preparation of the sol according to the present invention as nuclear particles can be prepared by the method comprising the above-mentioned steps (a) and (b).

Stannic oxide colloidal particles to be used in step (a) can be obtained from stannic oxide colloidal particles having a particle diameter of 4-50 nm formed by reacting hydrogen peroxide solution with metal tin in an organic acid aqueous solution in such a manner that a molar ratio of $H_2O_2/Sn$ is maintained within a range of 2-4 and a concentration of tin oxides is 40% by weight or less.

That is, hydrogen peroxide solution and metal tin are added in an organic acid aqueous solution while a molar ratio of $H_2O_2/Sn$ is maintained within a range of 2-4. The whole amount of hydrogen peroxide solution and metal tin can be added at a time in an organic acid aqueous solution, but it is preferable to add them alternately divided in several times. Although the order of adding hydrogen peroxide and metal tin is not specifically limited, it is required to maintain a molar ratio of $H_2O_2/Sn$ within a range of 2-4. Generally, hydrogen peroxide solution and metal tin are added and the reaction thereof is allowed to complete, and then the next hydrogen peroxide and metal tin are added. The reaction time for one reaction depends on added amount, and is generally about 5 to 10 minutes.

The weight ratio of an organic acid, hydrogen peroxide and metal tin used in step (a) is organic acid:hydrogen peroxide: metal tin=0.21-0.53:0.57-1.15:1.0.

The organic acid aqueous solution is preferably an oxalic acid aqueous solution or an organic acid aqueous solution containing oxalic acid as a main component, and more preferably an oxalic acid aqueous solution. The organic acid aqueous solution containing oxalic acid as a main component is an organic acid aqueous solution containing oxalic acid in an amount of 80% by weight or more in total organic acids, and residual components may be organic acids such as formic acid, acetic acid, etc. These organic acid aqueous solutions can be used in a concentration of preferably 1-30% by weight, more preferably 4-10% by weight.

A medium for the stannic oxide sol may be water or any hydrophilic organic solvent, but an aqueous sol is preferable in which a solvent is water. Further, pH of the sol may be such a value to make the sol stable, generally about 0.2-11. So long as an object of the present invention is attained, optional components such as alkaline substances, acidic substances and oxycarboxylic acids, etc. may be introduced in the stannic oxide sol for stabilization of the sol. A concentration of the stannic oxide sol used may be about 0.5-50% by weight of stannic oxide, but the concentration is preferably lower, more preferably 1-30% by weight.

The stannic oxide-zirconium oxide complex aqueous sol can be obtained by step (b) in which the above-mentioned stannic oxide sol is mixed with an oxyzirconium salt at a $ZrO_2/SnO_2$ weight ratio of 0.02-1.0 at 0-100° C. for 0.5-3 hours and step (c) in which it is heated at 60-200° C. for 0.1-50 hours.

As the oxyzirconium salts to be used, there may be mentioned zirconium oxychloride, zirconium oxynitrate, zirconium oxysulfate, oxyzirconium salts of organic acids such as zirconium oxyacetate, etc. and zirconium oxycarbonate. These oxyzirconium salts may be used as solids or aqueous solutions, and they are preferably used as aqueous solutions containing about 0.5-50% by weight of $ZrO_2$. Water-insoluble salts such as zirconium oxycarbonate can be used such a case that stannic oxide to be mixed is an acidic sol.

It is preferable to use the stannic oxide sol as an alkaline sol stabilized particularly with an organic base such as amine, and the mixing with oxyzirconium salt is carried out preferably at 0-100° C., preferably from room temperature to 60° C. And, the mixing may be carried out by adding the oxyzirconium salt to the stannic oxide sol with stirring or by adding the stannic oxide sol to the aqueous solution of the oxyzirconium salt with stirring, wherein the latter is more preferable. It is necessary to carry out the mixing sufficiently, and the mixing period is preferably 0.5-3 hours.

$WO_3$, $SnO_2$ and $SiO_2$ complex colloidal particles contained in the tungsten oxide-stannic oxide-silicon dioxide complex sol obtained in step (d) which is used as a coating sol according to the present invention can be observed as to a particle diameter by means of an electron microscope, and the particle diameter is 1-50 nm, preferably 2-7 nm, more preferably 2-5 nm. As a dispersing medium for the sol colloidal particles, water or any hydrophilic organic solvent may be used. The sol contains $WO_3$, $SnO_2$ and $SiO_2$ at a $WO_3/SnO_2$ weight ratio of 0.1-100 and a $SiO_2/SnO_2$ weight ratio of 0.1-100. A total concentration of $WO_3$, $SnO_2$ and $SiO_2$ contained in the sol is generally 40% by weight or less, in practice preferably 2% by weight or more, preferably 5-30% by weight. The sol exhibits pH of 1-9 and it is a colorless and transparent or slightly colloidal colored solution. And, it is stable for more than 3 months at room temperature, and more than 1 month even at 60° C. without any precipitation in the sol, and further a viscosity of the sol is not increased nor gelation is occurred.

A method for preparing a stable tungsten oxide-stannic oxide-silicon dioxide complex sol characterized in that complex colloidal particles of tungsten oxide ($WO_3$), stannic oxide ($SnO_2$) and silicon dioxide ($SiO_2$) obtained in step (d) are contained comprises the steps of:

(d-1) preparing an aqueous solution containing tungstate, stannate and silicate at a $WO_3/SnO_2$ weight ratio of 0.1-100 and a $SiO_2/SnO_2$ weight ratio of 0.1-100; and (d-2) removing cations present in the aqueous solution obtained in step (d-1).

As examples of tungstates, stannates and silicates to be used in step (d-1), there may be mentioned tungstates, stannates and silicates of alkali metals, ammonium, amines, etc. As preferable examples of these alkali metals, ammonium and amines, there may be mentioned those of Li, Na, K, Rb, Cs, $NH_4$, alkyl amines such as ethylamine, triethylamine, isopropylamine, n-propylamine, isobutylamine, diisobutylamine and di(2-ethylhexyl)amine, etc.; aralkyl amines such as benzylamine; alicyclic amines such as piperidine, etc.; and alkanol amines such as monoethanolamine and triethanolamine, etc. Particularly, sodium tungstate ($Na_2WO_4.2H_2O$), sodium stannate ($Na_2SnO_3.3H_2O$) and sodium silicate (water glass) are preferable. Further, those obtained after dissolving tungsten oxide, tungstic acid, stannic acid, silicate, etc. into an aqueous solution of alkali metal hydroxide may be used. Further, amine silicates and quaternary ammonium silicates obtained by adding alkyl amines such as ethylamine, triethylamine, isopropylamine, n-propylamine, isobutylamine, diisobutylamine and di(2-ethylhexyl)amine to active silicic acid as silicate may be used.

As the methods for preparing the aqueous solution in step (d-1), there may be mentioned a method of preparing the aqueous solution by dissolving respective powders of tungstate, stannate or silicate into water, a method of preparing the aqueous solution by mixing an aqueous tungstate solution, an aqueous stannate solution and aqueous silicate solution, and a method of preparing the aqueous solution by adding powders of tungstate and stannate as well as an aqueous solution of silicate into water.

The aqueous solution of tungstate to be used for the sol preparation in step (d) has preferably a $WO_3$ concentration of about 0.1-15% by weight, but higher concentrations may be used.

The aqueous solution of stannate to be used in the preparation of the sol in step (d) has preferably a $SnO_2$ concentration of about 0.1-30% by weight, but higher concentrations may be used.

The aqueous solution of silicate to be used in the preparation of the sol according to the present invention has preferably a $SiO_2$ concentration of about 0.1-30% by weight, but higher concentrations may be used.

The preparation of the aqueous solution in step (d-1) may be carried out at from room temperature to 100° C., preferably from room temperature to 60° C. The aqueous solution to be mixed has preferably a $WO_3/SnO_2$ weight ratio of 0.1-100 and a $SiO_2/SnO_2$ weight ratio of 0.1-100.

Step (d-2) is a step to remove cations present in the aqueous solution obtained in step (d-1). The decationizing treatment may be carried out by bringing it into contact with a hydrogen type ion exchanger or salting-out. The hydrogen type cation exchangers to be used herein may be any ones generally used, and it is convenient to use commercially available hydrogen type cation exchangers.

If the aqueous sol obtained via the steps (d-1) and (d-2) has a low concentration, the aqueous sol may be concentrated, if desired, by general concentration methods such as an evaporating method and an ultrafiltration method. In particular, the ultrafiltration method is preferable. During concentrating, the temperature of the sol is preferably maintained at about 100° C. or less, particularly at about 60° C. or less.

A hydrophilic organic solvent sol referred to an organosol can be obtained by substituting water in the aqueous sol in step (d) with a hydrophilic organic solvent.

The sol of tungsten oxide-stannic oxide-silicon dioxide complex obtained in step (d) contains complex particles comprising the tungsten oxide-stannic oxide-silicon dioxide complex obtained by complexing (subjecting to solid solution) tungsten oxide, stannic oxide and silicon dioxide homogeneously at atomic levels. Therefore, it is not obtained only by mixing three sols, that is, a tungsten oxide sol, a stannic oxide sol and a silicon dioxide sol.

Since particles of the tungsten oxide-stannic oxide-silicon dioxide complex sol form a solid solution, the tungsten oxide-stannic oxide-silicon dioxide complex sol cannot be decomposed into tungsten oxide particles, stannic oxide particles and silicon dioxide particles by solvent substitution.

The tungsten oxide-stannic oxide-silicon dioxide complex sol has improved water resistance, moisture resistance and weather resistance compared with the tungsten oxide-stannic oxide complex sol when formed into a coating by coating a substrate therewith.

If the $WO_3/SnO_2$ weight ratio of the sol obtained in step (d) is less than 0.1, the sol becomes unstable, and if the weight ratio is above 100, the sol does not exhibit stability. The oxycarboxylic acid to be added during the preparation of the above-mentioned organosol from the aqueous sol having high pH may contribute to stabilization of the sol, but water resistance of a dried coating obtained by using the sol becomes low if an addition amount thereof is 30% by weight or more based on the total of $WO_3$, $SnO_2$ and $SiO_2$. As examples of oxycarboxylic acids to be used, there may be mentioned lactic acid, tartaric acid, citric acid, gluconic acid, malic acid, glycolic acid, etc. Further, as alkali components, there may be mentioned, hydroxides of alkali metals such as Li, Na, K, Rb and Cs, etc. $NH_4$, alkyl amines such as ethylamine, triethylamine, isopropylamine and n-propylamine, etc.; aralkyl amines such as benzylamine, etc.; alicyclic amines such as piperidine, etc.; and alkanol amines such as monoethanolamine and triethanolamine, etc. These may be contained by mixing two or more thereof. Further, they may be used together with the above-mentioned acidic components. The pH of the sol varies according to amounts of alkali metal, ammonium, amine, oxycarboxylic acid, etc. in the sol. If the pH of the sol is lower than 1, the sol becomes unstable, and if the pH is above 9, colloidal particles of tungsten oxide, stannic oxide and silicon dioxide complex are easily dissolved in a solution. If the total concentration of $WO_3$, $SnO_2$ and $SiO_2$ in the sol is 40% by weight or more, the sol also becomes less stable. If the concentration is too low, the sol is not practical, and thus the preferable concentration for industrial products is 5-30% by weight.

If the ultrafiltration method is used as a concentrating method, polyanions, quite fine particles and the like co-present in the sol are passed through an ultrafiltration membrane together with water, and thus polyanions, quite fine particles and the like which cause instability of the sol can be removed from the sol.

Step (e) is a step to mix 100 parts by weight, calculated as the total of $ZrO_2$ and $SnO_2$ contained therein, of the stannic oxide-zirconium oxide complex aqueous sol obtained in step (c) and 2-100 parts by weight, calculated as the total of $WO_3$, $SnO_2$ and $SiO_2$ contained therein, of the tungsten oxide-stannic oxide-silicon dioxide complex aqueous sol having a particle diameter of 2-7 nm, a $WO_3/SnO_2$ weight ratio of 0.1-100 and a $SiO_2/SnO_2$ weight ratio of 0.1-100 obtained in step (d) at 0-100° C.

In step (e), colloidal particles of the tungsten oxide-stannic oxide-silicon dioxide complex sol are bonded on a surface of colloidal particles of the stannic oxide-zirconium oxide complex aqueous sol and the resultant surface is coated with the above-mentioned colloidal particles of tungsten oxide-stannic oxide-silicon dioxide complex, to generate a modified stannic oxide-zirconium oxide complex colloidal particles which have the colloidal particles as nuclei and which have surface properties of tungsten oxide-stannic oxide-silicon dioxide complex. Further, the sol can be obtained in which the modified stannic oxide-zirconium oxide complex colloidal particles are stably dispersed in the liquid medium.

In step (e), a sol in which the complex colloidal particles of this step are dispersed in a liquid medium can be obtained by mixing the tungsten oxide-stannic oxide-silicon dioxide complex sol obtained in step (d) with the stannic oxide-zirconium oxide complex sol obtained in step (c) and then adding active silicic acid stabilized with amine therein and stirring for 1-3 hours. The active silicic acid stabilized with amine is obtained for example by subjecting sodium silicate to cation exchange and then adding amines exemplified below. The amines include for example alkyl amines such as ethyl amine, triethylamine, isopropylamine, n-propylamine, diisobutyl amine, etc; aralkyl amines such as benzyl amine, etc.; alicyclic amines such as piperidine, etc.; alkanol amines such as monoethanol amine, triethanol amine, etc. Preferable amines include alkyl amines such as diisobutyl amine, etc.

The sol of stannic oxide-zirconium oxide complex colloidal particles modified with tungsten oxide-stannic oxide-silicon dioxide complex colloidal particles is obtained by step (e) of mixing 100 parts by weight, calculated as metal oxides thereof ($ZrO_2+SnO_2$), of the stannic oxide-zirconium oxide complex sol with 2-100 parts by weight, calculated as total of $WO_3$, $SnO_2$ and $SiO_2$, of the above-mentioned tungsten oxide-stannic oxide-silicon dioxide complex sol preferably with stirring strongly, and then step (f) of removing anions in the sol from the mixed sol.

The modified stannic oxide-zirconium oxide complex colloidal particles in the sol obtained by mixing step (e) can be observed by means of an electron microscope, and they have a particle diameter of about 4.5-60 nm. Although the sol obtained by the above-mentioned mixing has pH of about 1-9, it contains a number of anions such as $Cl^-$, $NO_2^-$ and $CH_3COO^-$, etc. derived from the oxyzirconium salt used for modification and thus micro-aggregation occurs in colloidal particles to lower transparency of the sol.

A stable sol of modified stannic oxide-zirconium oxide complex colloidal particles having good transparency can be obtained by step (f) of removing anions in the sol obtained by the above-mentioned mixing step.

Anion removal in step (f) can be attained by treating the sol obtained by the above-mentioned mixing with a hydroxide group type anion exchange resin at a temperature of 100° C. or less, preferably from room temperature to about 60° C. As hydroxide type anion exchange resins, there may be used commercially available ones, but strongly basic type ones such as Amberlite IRA-410 are preferable.

It is particularly preferable that the treatment by means of the hydroxide type anion exchange resin in step (f) is carried out at a metal oxide concentration of 1-10% by weight in the sol obtained by mixing step (e).

If the concentration of the modified stannic oxide-zirconium oxide complex obtained in steps (a)-(f) is desired to be higher, it can be concentrated up to about 50% by weight by general methods such as an evaporation method and an ultrafiltration method. And, if pH of the sol is controlled, it can be carried out by adding the above-mentioned hydroxides of alkali metals and ammonium, the above-mentioned amines and oxycarboxylic acids, etc. to the sol after concentrating. Particularly, the sol in which the total concentration of the above-mentioned metal oxides ($ZrO_2+SnO_2$) and ($WO_3+SnO_2+SiO_2$) is 10-50% by weight is preferably in practice.

Colloidal particles in the modified stannic oxide-zirconium oxide complex sol obtained in step (f) can be coated on their surfaces partly or totally with silane compounds such as ethyl silicate, methyltrimethoxysilane and γ-glycidoxypropyl-trimethoxysilane or hydrolysates thereof.

When the modified stannic oxide-zirconium oxide complex sol obtained by the above-mentioned mixing step is an aqueous sol, an organosol can be obtained by substituting the water medium of the aqueous sol with a hydrophilic organic solvent. The substitution can be carried out by general methods such as a distillation method and an ultrafiltration method. As examples of the hydrophilic organic solvents, there may be mentioned lower alcohols such as methyl alcohol, ethyl alcohol and isopropyl alcohol, etc.; straight-chained amides such as dimethylformamide and N,N'-dimethyl-acetamide, etc.; cyclic amides such as N-methyl-2-pyrrolidone, etc.; and glycols such as ethyl cellosolve, propylene glycol monomethyl ether and ethylene glycol, etc.

The above-mentioned substitution of water with the hydrophilic organic solvent can be carried out easily by general methods such as a distilling substitution method and an ultrafiltration method.

Colloidal particles of the modified stannic oxide-zirconium oxide complex sol which are coated on their surfaces with colloidal particles of the tungsten oxide-stannic oxide-silicon dioxide complex are negatively charged in the sol. The above-mentioned colloidal particles of the stannic oxide-zirconium oxide complex are positively charged, and colloidal particles of the tungsten oxide-stannic oxide-silicon dioxide complex are negatively charged. Therefore, it can be considered as follows; colloidal particles of the negatively charged tungsten oxide-stannic oxide-silicon dioxide complex are attracted electrically around colloidal particles of positively charged stannic oxide-zirconium oxide complex by mixing step (e), and colloidal particles of the tungsten oxide-stannic oxide-silicon dioxide complex are bonded on the surfaces of the positively charged colloidal particles by chemical bonding to coat the positively charged particle surfaces as nuclei with the tungsten oxide-stannic oxide-silicon dioxide complex and to form modified stannic oxide-zirconium oxide complex colloidal particles.

However, when the stannic oxide-zirconium oxide complex colloidal particles having a particle diameter of 4-50 nm as the nuclear sol are mixed with the tungsten oxide-stannic oxide-silicon dioxide complex colloidal particles as the coating sol, the stable sol cannot be obtained if the total amount of metal oxides of the coating sol ($WO_3+SnO_2+SiO_2$) is less than 2 parts by weight per 100 parts by weight of metal oxides of the nuclear sol ($ZrO_2+SnO_2$). It is considered that if the amount of the tungsten oxide-stannic oxide-silicon dioxide complex colloidal particles is insufficient, the coating surfaces of the stannic oxide-zirconium oxide complex colloidal particles as the nuclei become insufficient, thus aggregation of formed colloidal particles occurs easily to make the formed sol unstable. Therefore, the amount of the tungsten oxide-stannic oxide-silicon dioxide complex colloidal particles to be mixed may be less than that coats total surfaces of the stannic oxide-zirconium oxide complex colloidal particles but more than the minimum amount required to form the stable sol of the modified stannic oxide-zirconium oxide complex colloidal particles. When the amount above that used for surface coating of the tungsten oxide-stannic oxide-silicon dioxide complex colloidal particles is used, the obtained sol is formed as only just a stable mixed sol of the tungsten oxide-stannic oxide-silicon dioxide complex colloidal particle sol with the modified stannic oxide-zirconium oxide complex colloidal particle sol.

Preferably, the amount of the tungsten oxide-stannic oxide-silicon dioxide complex colloidal particles to be used may be less than 100 parts by weight of the ($WO_3$+$SnO_2$+$SiO_2$) per 100 parts by weight of total metal oxides of the nuclear sol ($ZrO_2$+$SnO_2$) in order to modify stannic oxide-zirconium oxide complex colloidal particles by surface coating.

The preferable, sol of the modified stannic oxide-zirconium oxide according to the present invention has pH of 3-11, and such a sol is liable to become unstable if pH is lower than 3. Further, if pH is above 11, the tungsten oxide-stannic oxide-silicon dioxide complex by which the modified stannic oxide-zirconium oxide complex colloidal particles are coated tends to dissolve easily in the solution. Further, if the total concentration of the above-mentioned metal oxides ($ZrO_2$+$SnO_2$) and ($WO_3$+$SnO_2$+$SiO_2$) is above 60% by weight, such a sol tends to become unstable. The preferable concentration for industrial materials is about 10-50% by weight.

Since tungsten oxide-stannic oxide-silicon dioxide complex colloidal particles tend to be hydrolyzed at a high temperature, the temperature of 100° C. or less is preferable during mixing in step (e), anion exchange in step (f) and concentrating, pH adjustment and solvent substitution after step (f).

EXAMPLES

Example 1

Step (a)

To 220 kg of pure water, 37.5 kg of oxalic acid (($COOH)_2 \cdot 2H_2O$) was dissolved, the resulting solution was poured in a 500 L vessel, heated to 70° C. with stirring, and 150 kg of 35% hydrogen peroxide solution and 75 kg of metal tin (manufactured by Yamaishi-Metals Co., Ltd., AT-Sn No. 200N) were added therein. The addition of hydrogen peroxide solution and metal tin was carried out alternatively. At first, 10 kg of 35% hydrogen peroxide solution was added and then 5 kg of metal tin was added. At the conclusion of the reaction thereof (5-10 minutes), this procedures were repeated. Time required for the addition was 2.5 hours, after the conclusion of the addition, the solution was further heated at 90° C. for 1 hour and the reaction was ceased. The molar ratio $H_2O_2$/Sn of hydrogen peroxide solution and metal tin was 2.48. The resulting stannic oxide sol was very excellent in transparency. The stannic oxide sol was obtained in an amount of 352 kg, and had a specific gravity of 1.312, pH of 1.49, a viscosity of 44 cp and a $SnO_2$ content of 26.1% by weight.

The observation by electron microscope showed that the resulting sol was spherical particles of 10-15 nm being excellent in dispersion property. Although the sol showed a tendency of slightly increasing in viscosity on standing, even after allowing to stand at room temperature for 6 months, it did not occur gelation and it was stable.

The resulting sol in an amount of 230 kg was diluted with pure water to 5% by weight in terms of $SnO_2$, 3 kg of isopropylamine was added therein, and the resulting solution was passed through a column filled with an anion exchange resin (Amberlite IRA-410) and heated and aged at 90° C. for 1 hour, and further passed through a column filled with an anion exchange resin (Amberlite IRA-410) to obtain 1431 kg of alkaline stannic oxide sol. 400 kg of the resulting sol was heated at 140° C. for 5 hours.

Step (b)

To 870 g of a zirconium oxychloride aqueous solution (18.4% by weight $ZrO_2$, containing 160 g of $ZrO_2$), 1 kg of pure water was added, then 25.7 kg (1068 g of $SnO_2$) of alkaline stannic oxide aqueous sol prepared in step (a) was added therein. The mixed solution was a sol having a $ZrO_2$/$SnO_2$ weight ratio of 0.15, colloidal color and good transparency.

Step (c)

The mixed solution prepared in step (b) was treated by heating at 90° C. for 5 hours with stirring, to obtain 27.6 kg of a stannic oxide-zirconium oxide complex aqueous sol. The sol had 3.37% by weight of $SnO_2$, 0.50% by weight of $ZrO_2$, 3.87% by weight of $SnO_2$+$ZrO_2$, colloidal color and good transparency.

Step (d)

No. 3 sodium silicate (containing 29.0% by weight of $SiO_2$) in an amount of 207 g was dissolved in 2650 g of water, and then 60.8 g of sodium tungstate $Na_2WO_4 \cdot 2H_2O$ (containing 74% by weight of $WO_3$) and 81.8 g of sodium stannate $NaSnO_3 \cdot H_2O$ (containing 55% by weight of $SnO_2$) were dissolved therein. Then, the solution was passed through a column of a hydrogen type cation exchange resin (Amberlite IR-120B) to obtain 3450 g of an acidic tungsten oxide-stannic oxide-silicon dioxide complex sol (pH of 2.1, containing 1.3% by weight of $WO_3$, 1.3% by weight of $SnO_2$ and 1.7% by weight of $SiO_2$, and having a $WO_3$/$SnO_2$ weight ratio of 1.0, a $SiO_2$/$SnO_2$ weight ratio of 1.33 and a particle diameter of 2.5 nm).

Step (e)

To 3450 g of the tungsten oxide-stannic oxide-silicon dioxide complex sol (containing 150 g of $WO_3$+$SnO_2$+$SiO_2$) prepared in step (d), 12200 g (containing 500 g of $ZrO_2$+$SnO_2$) of a stannic oxide-zirconium oxide complex aqueous sol was added with stirring over 20 minutes and continued to stir for 30 minutes. In the obtained mixed solution, a ratio of tungsten oxide-stannic oxide-silicon dioxide complex colloid ($WO_3$+$SnO_2$+$SiO_2$) to stannic oxide-zirconium oxide complex colloid ($ZrO_2$+$SnO_2$) was a ($WO_3$+$SnO_2$+$SiO_2$)/($ZrO_2$+$SnO_2$) weight ratio of 0.30, an amount of the total metal oxides was 4.2% by weight, and the solution exhibited a tendency of cloudiness due to micro-aggregation of colloidal particles.

Step (f)

To 15650 g of the mixed solution obtained in step (e), 11.0 g of diisobutylamine was added and then passed through a column filled with a hydroxide group type anion exchange resin (Amberlite IRA-410) at room temperature, then heated and aged at 80-90° C. for 1 hour, to obtain 19680 g of a modified stannic oxide-zirconium oxide complex aqueous sol (diluted solution). The sol had 3.3% by weight of total metal oxides, pH of 10.64, colloidal color and good transparency.

The modified stannic oxide-zirconium oxide complex aqueous sol (diluted solution) obtained in step (f) was concentrated by means of a filtering device fitted with an ultra-filtration membrane having about 100,000-molecular-weight cutoff at room temperature, to obtain 2641 g of a highly concentrated modified stannic oxide-zirconium oxide complex aqueous sol. The sol had 24.6% by weight of total metal oxides ($ZrO_2+SnO_2+WO_3+SiO_2$), and it was stable.

To 2641 g of the above-mentioned highly concentrated modified stannic oxide-zirconium oxide complex aqueous sol, 6.5 g of tartaric acid, 9.8 g of diisobutylamine and one drop of a defoamer (SN defoamer 483 made by Sannopco Co.) were added with stirring at room temperature and stirred for 1 hour. The sol was distilled off water under normal pressure by adding 24 liters of methanol little by little in a reaction flask equipped with a stirrer, to obtain 1620 g of a modified stannic oxide-zirconium oxide complex methanol sol wherein water of the aqueous sol was substituted with methanol. The sol had a specific gravity of 1.244, pH of 6.78 (an equal weight mixture with water), a viscosity of 1.3 mPa·s, 40.5% by weight of total metal oxides ($ZrO_2+SnO_2+WO_3+SiO_2$), a water content of 0.59% by weight and a particle diameter by an electron-microscopic observation of 10-15 nm.

The sol was concentrated to 47.0% by weight in total metal oxides ($ZrO_2+SnO_2+WO_3+SiO_2$), and the resulting sol had a viscosity of 6.5 mPa·s by subjecting it to viscosity measurement in a 100 cc measuring cylinder with B-type viscometer using No. 1 rotor at 60 rpm.

The sol had colloidal color and high transparency, and it was stable after 3 months at room temperature without any abnormality such as formation of precipitation, cloudiness and increase in viscosity. Further, a refractive index of the dried version of sol was 1.85.

Example 2

Example 2 was carried out similarly to steps (a), (b) and (c) in Example 1. Thereafter, the following steps were carried out.

Step (d)

No. 3 sodium silicate (containing 29.0% by weight of $SiO_2$) in an amount of 138 g was dissolved in 1766 g of water, and then 40.5 g of sodium tungstate $Na_2WO_4.2H_2O$ (containing 74% by weight of $WO_3$) and 55.6 g of sodium stannate $NaSnO_3.H_2O$ (containing 55% by weight of $SnO_2$) were dissolved therein. Then, the solution was passed through a column of a hydrogen type cation exchange resin (Amberlite IR-120B) to obtain 2520 g of an acidic tungsten oxide-stannic oxide-silicon dioxide complex sol (pH of 2.0, containing 1.2% by weight of $WO_3$, 1.2% by weight of $SnO_2$ and 1.6% by weight of $SiO_2$, and having a $WO_3/SnO_2$ weight ratio of 1.0, a $SiO_2/SnO_2$ weight ratio of 1.33 and a particle diameter of 2.5 nm).

Step (e)

To 2520 g of the tungsten oxide-stannic oxide-silicon dioxide complex sol (containing 150 g of $WO_3+SnO_2+SiO_2$) prepared in step (d), 12200 g (containing 500 g of $ZrO_2+SnO_2$) of a stannic oxide-zirconium oxide complex sol was added with stirring over 20 minutes and continued to stir for 30 minutes. In the obtained mixed solution, a ratio of tungsten oxide-stannic oxide-silicon dioxide complex colloid ($WO_3+SnO_2+SiO_2$) to stannic oxide-zirconium oxide complex colloid ($ZrO_2+SnO_2$) was a ($WO_3+SnO_2+SiO_2$)/($ZrO_2+SnO_2$) weight ratio of 0.20, an amount of the total metal oxides was 4.1% by weight, and the solution exhibited a tendency of cloudiness due to micro-aggregation of colloidal particles.

Step (f)

To 14720 g of the mixed solution obtained in step (e), 11.0 g of diisobutylamine was added and then passed through a column filled with a hydroxide group type anion exchange resin (Amberlite IRA-410) at room temperature, then heated and aged at 80-90° C. for 1 hour, to obtain 18480 g of a modified stannic oxide-zirconium oxide complex aqueous sol (diluted solution). The sol had 3.2% by weight of total metal oxides, pH of 10.23, colloidal color and good transparency.

The modified stannic oxide-zirconium oxide complex aqueous sol (diluted solution) obtained in step (f) was concentrated by means of a filtering device fitted with an ultra-filtration membrane having about 100,000-molecular-weight cutoff at room temperature, to obtain 3458 g of a highly concentrated modified stannic oxide-zirconium oxide complex aqueous sol. The sol had 14.8% by weight of total metal oxides ($Zro_2+SnO_2+WO_3+SiO_2$), and it was stable.

To 3243 g of the above-mentioned highly concentrated modified stannic oxide-zirconium oxide complex aqueous sol, 4.8 g of tartaric acid, 7.2 g of diisobutylamine and one drop of a defoamer (SN defoamer 483 made by Sannopco Co.) were added with stirring at room temperature and stirred for 1 hour. The sol was distilled off water under normal pressure by adding 26 liters of methanol little by little in a reaction flask equipped with a stirrer, to obtain 1240 g of a modified stannic oxide-zirconium oxide complex methanol sol wherein water of the aqueous sol was substituted with methanol. The sol had a specific gravity of 1.235, pH of 6.95 (an equal weight mixture with water), a viscosity of 1.5 mPa·s, 40.2% by weight of total metal oxides ($Zro_2+SnO_2+WO_3+SiO_2$), a water content of 0.90% by weight and a particle diameter by an electron-microscopic observation of 10-15 nm.

The sol had colloidal color and high transparency, and it was stable after 3 months at room temperature without any abnormality such as formation of precipitation, cloudiness and increase in viscosity. Further, a refractive index of the dried version of sol was 1.85.

Example 3

Example 3 was carried out similarly to steps (a), (b) and (c) in Example 1. Thereafter, the following steps were carried out.

Step (d)

No. 3 sodium silicate (containing 29.0% by weight of $SiO_2$) in an amount of 101.6 g was dissolved in 1825 g of water, and then 32.3 g of sodium tungstate $Na_2WO_4.2H_2O$ (containing 74% by weight of $WO_3$) and 40.8 g of sodium stannate $NaSnO_3.H_2O$ (containing 55% by weight of $SnO_2$) were dissolved therein. Then, the solution was passed through a column of a hydrogen type cation exchange resin (Amberlite IR-120B) to obtain 2640 g of an acidic tungsten oxide-stannic oxide-silicon dioxide complex sol (pH of 2.1, containing 0.9% by weight of $WO_3$, 0.9% by weight of $SnO_2$ and 1.1% by weight of $SiO_2$, and having a $WO_3/SnO_2$ weight ratio of 1.0, a $SiO_2/SnO_2$ weight ratio of 1.33 and a particle diameter of 2.5 nm).

Step (e)

To 2640 g of the tungsten oxide-stannic oxide-silicon dioxide complex sol (containing 75 g of $WO_3+SnO_2+SiO_2$) prepared in step (d), 12200 g (containing 500 g of $ZrO_2+SnO_2$) of a stannic oxide-zirconium oxide complex sol was added with stirring over 20 minutes and continued to stir for 30 minutes. In the obtained mixed solution, a ratio of tungsten oxide-stannic oxide-silicon dioxide complex colloid ($WO_3+SnO_2+SiO_2$) to stannic oxide-zirconium oxide complex colloid ($ZrO_2+SnO_2$) was a ($WO_3+SnO_2+SiO_2$)/($ZrO_2+SnO_2$) weight ratio of 0.14, an amount of the total metal oxides was 3.9% by weight, and the solution exhibited a tendency of cloudiness due to micro-aggregation of colloidal particles.

Step (f)

To 14840 g of the mixed solution obtained in step (e), 11.0 g of diisobutylamine was added and then passed through a column filled with a hydroxide group type anion exchange resin (Amberlite IRA-410) at room temperature, then heated and aged at 80-90° C. for 1 hour, to obtain 19360 g of a modified stannic oxide-zirconium oxide complex aqueous sol (diluted solution). The sol had 3.0% by weight of total metal oxides, pH of 10.50, colloidal color and good transparency.

The modified stannic oxide-zirconium oxide complex aqueous sol (diluted solution) obtained in step (f) was concentrated by means of a filtering device fitted with an ultra-filtration membrane having about 100,000-molecular-weight cutoff at room temperature, to obtain 2352 g of a highly concentrated modified stannic oxide-zirconium oxide complex aqueous sol. The sol had 22.0% by weight of total metal oxides ($ZrO_2+SnO_2+WO_3+SiO_2$), and it was stable.

To 2272 g of the above-mentioned highly concentrated modified stannic oxide-zirconium oxide complex aqueous sol, 5.0 g of tartaric acid, 7.5 g of diisobutylamine and one drop of a defoamer (SN defoamer 483 made by Sannopco Co.) were added with stirring at room temperature and stirred for 1 hour. The sol was distilled off water under normal pressure by adding 22 liters of methanol little by little in a reaction flask equipped with a stirrer, to obtain 1190 g of a modified stannic oxide-zirconium oxide complex methanol sol wherein water of the aqueous sol was substituted with methanol. The sol had a specific gravity of 1.232, pH of 6.92 (an equal weight mixture with water), a viscosity of 1.3 mPa·s, 40.3% by weight of total metal oxides ($Zro_2+SnO_2+WO_3+SiO_2$), a water content of 0.43% by weight and a particle diameter by an electron-microscopic observation of 10-15 nm.

The sol had colloidal color and high transparency, and it was stable after 3 months at room temperature without any abnormality such as formation of precipitation, cloudiness and increase in viscosity. Further, a refractive index of the dried version of sol was 1.85.

Example 4

Step (a)

To 363 kg of pure water, 37.5 kg of oxalic acid (($COOH)_2$·$2H_2O$) was dissolved, the resulting solution was poured in a 500 L vessel, heated to 70° C. with stirring, and 150 kg of 35% hydrogen peroxide solution and 75 kg of metal tin (manufactured by Yamaishi-Metals Co., Ltd., AT-Sn No. 200N) were added therein. The addition of hydrogen peroxide solution and metal tin was carried out alternatively. At first, 10 kg of 35% hydrogen peroxide solution was added and then 5 kg of metal tin was added. At the conclusion of the reaction thereof (5-10 minutes), this procedures were repeated. Time required for the addition was 2.5 hours, after the conclusion of the addition, 10 kg of 35% hydrogen peroxide solution was further added, and the resulting solution was heated at 90° C. for 1 hour and the reaction was ceased. The molar ratio $H_2O_2$/Sn of hydrogen peroxide solution and metal tin was 2.60. The resulting stannic oxide sol was very excellent in transparency. The stannic oxide sol was obtained in an amount of 622 kg, and had a specific gravity of 1.156, pH of 1.56 and an $SnO_2$ content of 15.0% by weight.

The observation by electron microscope showed that the resulting sol was spherical particles of 10-15 nm being excellent in dispersion property. Although the sol showed a tendency of slightly increasing in viscosity on standing, it did not occur gelation and it was stable.

The resulting sol in an amount of 622 kg was diluted with pure water to 5% by weight in terms of $SnO_2$, 4.7 kg of isopropylamine was added therein, and the resulting solution was passed through a column filled with an anion exchange resin (Amberlite IRA-410) and heated and aged at 95° C. for 1 hour, and further passed through a column filled with an anion exchange resin (Amberlite IRA-410) to obtain 2194 kg of alkaline stannic oxide sol. The resulting sol was heated at 140° C. for 5 hours.

Step (b)

To 76.1 kg of a zirconium oxychloride aqueous solution (17.68% by weight $ZrO_2$, containing 13.5 kg of $ZrO_2$), 330 kg of pure water and 3.2 kg of 35% hydrochloric acid were added, then 2597 kg (89.7 kg of $SnO_2$) of alkaline stannic oxide aqueous sol prepared in step (a) was added therein. The mixed solution was a sol having a $ZrO_2/SnO_2$ weight ratio of 0.15, colloidal color and good transparency.

Step (c)

The mixed solution prepared in step (b) was treated by heating at 95° C. for 5 hours with stirring, to obtain 2958 kg of a stannic oxide-zirconium oxide complex aqueous sol. The sol had 3.03% by weight of $SnO_2$, 0.46% by weight of $ZrO_2$, 3.49% by weight of $SnO_2+ZrO_2$, colloidal color and good transparency.

Step (d)

No. 3 sodium silicate (containing 29.3% by weight of $SiO_2$) in an amount of 38.9 kg was dissolved in 830 g of pure water, and then 12.2 kg of sodium tungstate $Na_2WO_4.2H_2O$ (containing 69.8% by weight of $WO_3$) and 15.3 kg of sodium stannate $NaSnO_3.H_2O$ (containing 55.7% by weight of $SnO_2$) were dissolved therein. Then, the solution was passed through a column of a hydrogen type cation exchange resin (Amberlite IR-120B) to obtain 1201 kg of an acidic tungsten oxide-stannic oxide-silicon dioxide complex sol (pH of 2.2, containing 0.7% by weight of $WO_3$, 0.7% by weight of $SnO_2$ and 0.9% by weight of $SiO_2$, and having a $WO_3/SnO_2$ weight ratio of 1.0 and a $SiO_2/SnO_2$ weight ratio of 1.33).

Step (e)

To 1179 kg of the tungsten oxide-stannic oxide-silicon dioxide complex sol (containing 28.4 kg of $WO_3+SnO_2+SiO_2$) prepared in step (d), 2958 kg (containing 103.2 kg of $ZrO_2+SnO_2$) of a stannic oxide-zirconium oxide complex sol was added with stirring over 60 minutes and continued to stir for 10 minutes. In the obtained mixed solution, a ratio of tungsten oxide-stannic oxide-silicon dioxide complex colloid ($WO_3+SnO_2+SiO_2$) to stannic oxide-zirconium oxide complex colloid ($ZrO_2+SnO_2$) was a ($WO_3+SnO_2+SiO_2$)/($ZrO_2+SnO_2$) weight ratio of 0.25, an amount of the total metal oxides was 3.46% by weight, and the solution exhibited a tendency of cloudiness due to micro-aggregation of colloidal particles.

Step (f)

To 3798 kg of the mixed solution obtained in step (e), 2.3 kg of diisobutylamine was added and then passed through a column filled with a hydroxide group type anion exchange resin (Amberlite IRA-410) at room temperature, then heated and aged at 90° C. for 1 hour, to obtain a modified stannic oxide-zirconium oxide complex aqueous sol (diluted solution). The sol had pH of 9.59, colloidal color and good transparency.

The modified stannic oxide-zirconium oxide complex aqueous sol (diluted solution) obtained in step (e) was concentrated by means of a filtering device fitted with an ultra-filtration membrane having about 100,000-molecular-weight cutoff at 40-50° C., to obtain 365 kg of a highly concentrated modified stannic oxide-zirconium oxide complex aqueous sol. The sol had 33.5% by weight of total metal oxides ($ZrO_2$+$SnO_2$+$WO_3$+$SiO_2$), and it was stable.

To 350 kg of the above-mentioned highly concentrated modified stannic oxide-zirconium oxide complex aqueous sol, 1.1 kg of tartaric acid, 1.7 kg of diisobutylamine and one drop of a defoamer (SN defoamer 483 made by Sannopco Co.) were added with stirring at room temperature and stirred for 1 hour. The sol was distilled off water under normal pressure by adding 4203 kg of methanol in a reactor equipped with a stirrer, to obtain 218 kg of a modified stannic oxide-zirconium oxide complex methanol sol wherein water of the aqueous sol was substituted with methanol. The sol had a specific gravity of 1.285, pH of 6.40 (an equal weight mixture with water), a viscosity of 1.3 mPa·s, 42.8% by weight of total metal oxides ($ZrO_2$+$SnO_2$+$WO_3$+$SiO_2$), a water content of 0.34% by weight and a particle diameter by an electron-microscopic observation of 10-15 nm.

The sol was concentrated to 47.8% by weight in total metal oxides ($ZrO_2$+$SnO_2$+$WO_3$+$SiO_2$), and the resulting sol had a viscosity of 5.5 mPa·s by subjecting it to viscosity measurement in a 100 cc measuring cylinder with B-type viscometer using No. 1 rotor at 60 rpm.

The sol had colloidal color and high transparency, and it was stable at room temperature without any abnormality such as formation of precipitation, cloudiness and increase in viscosity. Further, a refractive index of the dried version of sol was 1.85.

Example 5

Step (a)

To 363 kg of pure water, 37.5 kg of oxalic acid (($COOH)_2$·$2H_2O$) was dissolved, the resulting solution was poured in a 500 L vessel, heated to 70° C. with stirring, and 150 kg of 35% hydrogen peroxide solution and 75 kg of metal tin (manufactured by Yamaishi-Metals Co., Ltd., AT-Sn No. 200N) were added therein. The addition of hydrogen peroxide solution and metal tin was carried out alternatively. At first, 10 kg of 35% hydrogen peroxide solution was added and then 5 kg of metal tin was added. At the conclusion of the reaction thereof (5-10 minutes), this procedures were repeated. Time required for the addition was 2.5 hours, after the conclusion of the addition, 10 kg of 35% hydrogen peroxide solution was further added and the resulting solution was heated at 90° C. for 1 hour and the reaction was ceased. The molar ratio $H_2O_2$/Sn of hydrogen peroxide and metal tin was 2.60. The resulting stannic oxide sol was very excellent in transparency. The stannic oxide sol was obtained in an amount of 626 kg, and had a specific gravity of 1.154, pH of 1.56 and an $SnO_2$ content of 14.9% by weight.

The observation by electron microscope showed that the resulting sol was spherical particles of 10-15 nm being excellent in dispersion property. Although the sol showed a tendency of slightly increasing in viscosity on standing, it did not occur gelation and it was stable.

The resulting sol in an amount of 626 kg was diluted with pure water to 5% by weight in terms of $SnO_2$, 4.66 kg of isopropylamine was added therein, and the resulting solution was passed through a column filled with an anion exchange resin (Amberlite IRA-410) and heated and aged at 95° C. for 1 hour, and further passed through a column filled with an anion exchange resin (Amberlite IRA-410) to obtain 2535 kg of alkaline stannic oxide sol. Then, the resulting sol was heated at 140° C. for 5 hours.

Step (b)

To 78.2 kg of a zirconium oxychloride aqueous solution (17.68% by weight $ZrO_2$, containing 13.8 kg of $ZrO_2$), 300 kg of pure water and 3.3 kg of 35% hydrochloric acid were added, then 2529 kg (91.0 kg of $SnO_2$) of alkaline stannic oxide aqueous sol prepared in step (a) was added therein. The mixed solution was a sol having a $ZrO_2$/$SnO_2$ weight ratio of 0.15, colloidal color and good transparency.

Step (c)

The mixed solution prepared in step (b) was treated by heating at 95° C. for 5 hours with stirring, to obtain 3471 kg of a stannic oxide-zirconium oxide complex aqueous sol. The sol had 2.62% by weight of $SnO_2$, 0.40% by weight of $ZrO_2$, 3.01% by weight of $SnO_2$+$ZrO_2$, colloidal color and good transparency.

Step (d)

No. 3 sodium silicate (containing 29.3% by weight of $SiO_2$) in an amount of 49.8 kg was dissolved in 898 kg of water, and then 10.5 kg of sodium tungstate $Na_2WO_4$·$2H_2O$ (containing 69.8% by weight of $WO_3$) and 13.1 kg of sodium stannate $NaSnO_3$·$H_2O$ (containing 55.7% by weight of $SnO_2$) were dissolved therein. Then, the solution was passed through a column of a hydrogen type cation exchange resin (Amberlite IR-120B) to obtain 1179 kg of an acidic tungsten oxide-stannic oxide-silicon dioxide complex sol (pH of 2.0, containing 0.6% by weight of $WO_3$, 0.6% by weight of $SnO_2$ and 1.2% by weight of $SiO_2$, and having a $WO_3$/$SnO_2$ weight ratio of 1.0 and a $SiO_2$/$SnO_2$ weight ratio of 2.0).

Step (e)

To 1179 kg of the tungsten oxide-stannic oxide-silicon dioxide complex sol (containing 29.2 kg of $WO_3$+$SnO_2$+$SiO_2$) prepared in step (d), 3471 kg (containing 104.8 kg of $ZrO_2$+$SnO_2$) of a stannic oxide-zirconium oxide complex sol was added with stirring over 60 minutes and continued to stir for 10 minutes. In the obtained mixed solution, a ratio of tungsten oxide-stannic oxide-silicon dioxide complex colloid ($WO_3$+$SnO_2$+$SiO_2$) to stannic oxide-zirconium oxide complex colloid ($ZrO_2$+$SnO_2$) was a ($WO_3$+$SnO_2$+$SiO_2$)/($ZrO_2$+$SnO_2$) weight ratio of 0.25, an amount of the total metal oxides was 2.9% by weight, and the solution exhibited a tendency of cloudiness due to micro-aggregation of colloidal particles.

Step (f)

To 4650 kg of the mixed solution obtained in step (e), 2.3 kg of diisobutylamine was added and then passed through a column filled with a hydroxide group type anion exchange resin (Amberlite IRA-410) at room temperature, then heated and aged at 90° C. for 1 hour; to a modified stannic oxide-zirconium oxide complex aqueous sol (diluted solution). The sol had pH of 9.1, colloidal color and good transparency.

The modified stannic oxide-zirconium oxide complex aqueous sol (diluted solution) obtained in step (f) was concentrated by means of a filtering device fitted with an ultra-filtration membrane having about 100,000-molecular-weight cutoff at 40-50° C., to obtain 358 kg of a highly concentrated modified stannic oxide-zirconium oxide complex aqueous sol. The sol had 31.9% by weight of total metal oxides ($ZrO_2$+$SnO_2$+$WO_3$+$SiO_2$), and it was stable.

To 358 kg of the above-mentioned highly concentrated modified stannic oxide-zirconium oxide complex aqueous sol, 1.1 kg of tartaric acid, 1.7 kg of diisobutylamine and one drop of a defoamer (SN defoamer 483 made by Sannopco Co.) were added with stirring at room temperature and stirred for 1 hour. The sol was distilled off water under normal pressure by adding 5010 liters of methanol little by little in a reactor equipped with a stirrer, to obtain 220 kg of a modified stannic oxide-zirconium oxide complex methanol sol wherein water of the aqueous sol was substituted with methanol. The sol had a specific gravity of 1.280, pH of 6.59 (an equal weight mixture with water), a viscosity of 2.1 mPa·s, 42.8% by weight of total metal oxides ($ZrO_2+SnO_2+WO_3+SiO_2$), a water content of 0.43% by weight and a particle diameter by an electron-microscopic observation of 10-15 nm.

The methanol sol was concentrated to 46.8% by weight in total metal oxides ($ZrO_2+SnO_2+WO_3+SiO_2$), and the resulting sol had a viscosity of 6.3 mPa·s by subjecting it to viscosity measurement in a 100 cc measuring cylinder with B-type viscometer using No. 1 rotor at 60 rpm.

The sol had colloidal color and high transparency, and it was stable at room temperature without any abnormality such as formation of precipitation, cloudiness and increase in viscosity. Further, a refractive index of the dried version of sol was 1.85.

Example 6

Step (a)

To 383 kg of pure water, 37.5 kg of oxalic acid ($(COOH)_2\cdot2H_2O$) was dissolved, the resulting solution was poured in a 500 L vessel, heated to 70° C. with stirring, and 150 kg of 35% hydrogen peroxide solution and 75 kg of metal tin (manufactured by Yamaishi-Metals Co., Ltd., AT-Sn No. 200N) were added therein. The addition of hydrogen peroxide solution and metal tin was carried out alternatively. At first, 10 kg of 35% hydrogen peroxide solution was added and then 5 kg of metal tin was added. At the conclusion of the reaction thereof (5-10 minutes), this procedures were repeated. After the total amount was added, 10 kg of 35% hydrogen peroxide solution was further added. Time required for the addition was 2.5 hours, after the conclusion of the addition, the resulting solution was further heated at 95° C. for 1 hour and the reaction was ceased. The molar ratio $H_2O_2/Sn$ of hydrogen peroxide solution and metal tin was 2.61. The resulting stannic oxide sol was very excellent in transparency. The stannic oxide sol was obtained in an amount of 630 kg, and had a specific gravity of 1.154, pH of 1.51 and a $SnO_2$ content of 14.7% by weight.

The observation by electron microscope showed that the resulting sol was spherical particles of 10-15 nm being excellent in dispersion property. Although the sol showed a tendency of slightly increasing in viscosity on standing, even after allowing to stand at room temperature for 6 months, it did not occur gelation and it was stable.

To 629 kg of the resulting sol, 231 kg of 35% hydrogen peroxide solution and 52 kg of pure water were added and the resulting sol was diluted in such a manner that the concentration of $SnO_2$ was 10% by weight and $H_2O_2/(COOH)_2$ molar ratio on charging was 8.0, heated to 95° C. and aged for 5 hours. With this procedure, oxalic acid contained therein was decomposed in carbonic acid gas and water by reaction with hydrogen peroxide. After the resulting stannic oxide slurry was cooled to about 40° C., 2.7 kg of isopropylamine was added therein. After deflocculation, the resulting slurry was passed through a catalyst tower filled with ca. 15 L of platinum catalyst (N-220 manufactured by SÜD-CHEMIE CATALYSTS JAPAN, INC.) and circulated to be subjected to decomposition of excess hydrogen peroxide. The passing rate was ca. 30 L/min. and the circulation was carried out for 5 hours. Further, the resulting solution was passed through a column filled with an anion exchange resin (Amberlite IRA-410) to obtain 1545 kg of alkaline stannic oxide sol. Then, after 1.8 kg of isopropylamine was additionally added to the total sol, the resulting sol was heated at 140° C. for 5 hours.

Step (b)

To 1238 kg of pure water, 76 kg of a zirconium oxychloride aqueous solution (17.68% by weight $ZrO_2$) and 3.2 kg of 35% hydrochloric acid were added, then 1538 kg (102.9 kg of $SnO_2$) of alkaline stannic oxide aqueous sol prepared in step (a) was added therein. The mixed solution was a sol having a $ZrO_2/SnO_2$ weight ratio of 0.15, colloidal color and good transparency.

Step (c)

The mixed solution prepared in step (b) was treated by heating at 90° C. for 5 hours with stirring, to obtain 3224 kg (containing water drive) of a stannic oxide-zirconium oxide complex sol after cooling and removing. The sol had 2.78% by weight of $SnO_2$, 0.41% by weight of $ZrO_2$, 3.19% by weight of $SnO_2+ZrO_2$, colloidal color and good transparency.

Step (d)

No. 3 sodium silicate (containing 29.0% by weight of $SiO_2$) in an amount of 59.5 g was dissolved in 1083 g of water, and then 12.6 g of sodium tungstate $Na_2WO_4\cdot2H_2O$ (containing 70% by weight of $WO_3$) and 16.2 g of sodium stannate $NaSnO_3\cdot H_2O$ (containing 55% by weight of $SnO_2$) were dissolved therein. Then, the solution was passed through a column of a hydrogen type cation exchange resin (Amberlite IR-120B) to obtain 1520 g of an acidic tungsten oxide-stannic oxide-silicon dioxide complex sol (pH of 2.3, containing 0.6% by weight of $WO_3$, 0.6% by weight of $SnO_2$ and 1.2% by weight of $SiO_2$, and having a $WO_3/SnO_2$ weight ratio of 1.0 and a $SiO_2/SnO_2$ weight ratio of 2.0).

In addition, separately, 112 g of No. 3 sodium silicate (containing 29.0% by weight of $SiO_2$) was dissolved in 540 g of water, and the resulting solution was passed through a column of a hydrogen type cation exchange resin (Amberlite IR-120B) to obtain active silicic acid, 6.9 g of diisobutylamine was added therein, 930 g of active silicic acid stabilized with diisobutylamine was obtained.

Step (e)

To 1520 g of the tungsten oxide-stannic oxide-silicon dioxide complex sol (containing 35.1 g of $WO_3+SnO_2+SiO_2$) prepared in step (d), 15656 g (containing 501 g of $ZrO_2+SnO_2$) of a stannic oxide-zirconium oxide complex sol prepared in step (c) was added with stirring over 20 minutes and continued to stir for 30 minutes. Further, active silicic acid stabilized with diisobutylamine was added and continued to stir for 1 hour. In the obtained mixed solution, a ratio of tungsten oxide-stannic oxide-silicon dioxide complex colloid ($WO_3+SnO_2+SnO_2$) to stannic oxide-zirconium oxide complex colloid ($ZrO_2+SnO_2$) was a ($WO_3+SnO_2+SiO_2$)/($ZrO_2+SnO_2$) weight ratio of 0.135, an amount of the total metal oxides was 3.1% by weight, and the solution exhibited a tendency of cloudiness due to micro-aggregation of colloidal particles.

Step (f)

To 18106 g of the mixed solution obtained in step (e), 5.0 g of diisobutylamine was added and then passed through a column filled with a hydroxide group type anion exchange resin (Amberlite IRA-410) at room temperature, then heated and aged at 80-90° C. for 1 hour, to obtain 24050 g of a modified stannic oxide-zirconium oxide complex aqueous sol (diluted solution). The sol had 2.4% by weight of total metal oxides, pH of 9.25, colloidal color and good transparency.

The modified stannic oxide-zirconium oxide complex aqueous sol (diluted solution) obtained in step (f) was concentrated by means of a filtering device fitted with an ultra-filtration membrane having about 100,000-molecular-weight cutoff at room temperature, to obtain 2010 g of a highly concentrated modified stannic oxide-zirconium oxide complex aqueous sol. The sol had 28.2% by weight of total metal oxides ($ZrO_2+SnO_2+WO_3+SiO_2$), and it was stable.

The above-mentioned highly concentrated modified stannic oxide-zirconium oxide complex aqueous sol in an amount of 2010 g was distilled off water under normal pressure by adding 28 liters of methanol little by little in a reaction flask equipped with a stirrer, to obtain 1310 g of a modified stannic oxide-zirconium oxide complex methanol sol wherein water of the aqueous sol was substituted with methanol. The sol had a specific gravity of 1.264, pH of 8.3 (an equal weight mixture with water), a viscosity of 2.7 mPa·s, 42.5% by weight of total metal oxides ($ZrO_2+SnO_2+WO_3+SiO_2$), a water content of 1.0% by weight and a particle diameter by an electron-microscopic observation of 10-15 nm.

The sol had colloidal color and high transparency, and it was stable after 3 months at room temperature without any abnormality such as formation of precipitation, cloudiness and increase in viscosity. Further, a refractive index of the dried version of sol was 1.85.

Referential Example 1

Step (a)

To 110 kg of pure water, 41 kg of 35% hydrochloric acid was dissolved, the resulting solution was poured in a 500 L vessel, heated to 50° C. with stirring, and 185 kg of 35% hydrogen peroxide solution and 90 kg of metal tin (manufactured by Yamaishi-Metals Co., Ltd., AT-Sn No. 200N) were added therein. The addition of hydrogen peroxide solution and metal tin was carried out alternatively. At first, 10 kg of 35% hydrogen peroxide solution was added and then 5 kg of metal tin was added. At the conclusion of the reaction thereof (5-10 minutes), this procedures were repeated. Time required for the addition was about 4 hours, after the conclusion of addition, 5 kg of 35% hydrogen peroxide solution was further added, the solution was heated at 80-90° C. for 1 hour and the reaction was ceased. The molar ratio $H_2O_2/Sn$ of hydrogen peroxide solution and metal tin was 2.58. The resulting stannic oxide sol was very excellent in transparency. The stannic oxide sol was obtained in an amount of 342 kg, and had a $SnO_2$ content of 33.0% by weight, an HCl content of 2.56% by weight, a spindle colloidal particle diameter by electron microscope of 10 nm or less, and a particle diameter of 107 nm determined by dynamic light scattering method with N4 analyzer manufactured by Beckman Coulter, Inc., USA. After 342 kg of pale yellow and transparent stannic oxide aqueous sol was dispersed in 1550 kg of water, 2.16 kg of isopropylamine was added therein, then the resulting dispersion was passed through a hydroxide group type anion exchange resin to obtain 2138 kg of alkaline stannic oxide aqueous sol. The sol was stable and had colloidal color, very high transparency, pH of 9.65, a viscosity of 1.4 mPa·s, a $SnO_2$ content of 5.15% by weight and an isopropylamine content of 0.10% by weight.

Step (b)

To 93.4 kg of a zirconium oxychloride aqueous solution (17.68% by weight $ZrO_2$) prepared by dissolving zirconium oxychloride ($ZrOCl_2.8H_2O$) in water, and 733 kg of pure water, 2138 kg (110.1 kg of $SnO_2$) of alkaline stannic oxide aqueous sol prepared in step (a) was added with stirring at room temperature therein, and continued to stir for 1 hour. The mixed solution was a sol having a $ZrO_2/SnO_2$ weight ratio of 0.15, colloidal color and good transparency.

Step (c)

The mixed solution prepared in step (b) was treated by heating at 90° C. for 5 hours with stirring, to obtain 2994 kg of a stannic oxide-zirconium oxide complex aqueous sol. The sol had 3.68% by weight of $SnO_2$, 0.55% by weight of $ZrO_2$, 4.23% by weight of $SnO_2+ZrO_2$, pH of 1.43, a particle diameter of 9.0 nm, colloidal color and good transparency.

Step (d)

No. 3 sodium silicate (containing 29.4% by weight of $SiO_2$) in an amount of 37.93 kg was dissolved in 834 kg of water, and then 12.02 kg of sodium tungstate $Na_2WO_4.2H_2O$ (containing 70% by weight of $WO_3$) and 15.19 kg of sodium stannate $NaSnO_3.H_2O$ (containing 55% by weight of $SnO_2$) were dissolved therein. Then, the solution was passed through a column of a hydrogen type cation exchange resin to obtain 1111 kg of an acidic tungsten oxide-stannic oxide-silicon dioxide complex sol (pH of 2.1, containing 0.75% by weight of $WO_3$, 0.75% by weight of $SnO_2$ and 1.0% by weight of $SiO_2$, and having a $WO_3/SnO_2$ weight ratio of 1.0, a $SiO_2/SnO_2$ weight ratio of 1.33 and a particle diameter of 2.5 nm).

Step (e)

To 1111 kg of the tungsten oxide-stannic oxide-silicon dioxide complex sol (containing 27.36 kg of $WO_3+SnO_2+SiO_2$) prepared in step (d), 2994 kg (containing 126.63 kg of $ZrO_2+SnO_2$) of a stannic oxide-zirconium oxide complex aqueous sol prepared in step (c) was added with stirring over 60 minutes and continued to stir for 60 minutes. In the obtained mixed solution, a ratio of tungsten oxide-stannic oxide-silicon dioxide complex colloid ($WO_3+SnO_2+SiO_2$) to stannic oxide-zirconium oxide complex colloid ($ZrO_2+SnO_2$) was a ($WO_3+SnO_2+SiO_2$)/($ZrO_2+SnO_2$) weight ratio of 0.20, an amount of the total metal oxides was 3.8% by weight, and the solution exhibited a tendency of cloudiness due to micro-aggregation of colloidal particles.

Step (f)

To 4105 kg of the mixed solution obtained in step (e), 3.09 kg of diisobutylamine was added and then passed through a column filled with a hydroxide group type anion exchange resin (Amberlite IRA-410), then heated and aged at 80° C. for 1 hour, to obtain 4685 kg of a modified stannic oxide-zirconium oxide complex aqueous sol (diluted solution). The sol had 3.30% by weight of total metal oxides, pH of 7.73, colloidal color and good transparency.

The modified stannic oxide-zirconium oxide complex aqueous sol (diluted solution) obtained in step (f) was concentrated by means of a filtering device fitted with an ultra-filtration membrane having about 100,000-molecular-weight cutoff at room temperature, to obtain 377 kg of a highly concentrated modified stannic oxide-zirconium oxide complex aqueous sol. The sol had pH of 7.70, 37.0% by weight of total metal oxides ($ZrO_2+SnO_2+WO_3+SiO_2$), and it was stable.

To 377 kg of the above-mentioned highly concentrated modified stannic oxide-zirconium oxide complex aqueous sol, 1.40 kg of tartaric acid, 2.10 kg of diisobutylamine and a small quantity of a defoamer (SN defoamer 483 made by Sannopco Co.) were added with stirring at room temperature and stirred for 1 hour. The sol was distilled off water under reduced pressure 750 Torr by adding 5417 kg of methanol little by little in a reaction reactor equipped with a stirrer, to obtain 428 kg of a modified stannic oxide-zirconium oxide complex methanol sol wherein water of the aqueous sol was substituted with methanol. The sol had a specific gravity of 1.123, pH of 7.4 (an equal weight mixture with water), a viscosity of 2.5 mPa·s, 32.6% by weight of total metal oxides ($ZrO_2+SnO_2+WO_3+SiO_2$), a water content of 0.62% by weight and a particle diameter by an electron-microscopic observation of 10-15 nm.

The methanol sol was concentrated to 47.0% by weight in total metal oxides ($ZrO_2+SnO_2+WO_3+SiO_2$), and the resulting sol had a viscosity of 15.0 mPa·s by subjecting it to viscosity measurement in a 100 cc measuring cylinder with B-type viscometer using No. 1 rotor at 60 rpm.

The sol had colloidal color and high transparency, and it was stable after 3 months at room temperature without any abnormality such as formation of precipitation, cloudiness and increase in viscosity. Further, a refractive index of the dried version of sol was 1.76.

What is claimed is:

1. A method for preparing a stable sol of modified stannic oxide-zirconium oxide complex colloidal particles having a particle diameter of 4.5-60 nm, wherein the particles are formed by coating surfaces of spherical stannic oxide-zirconium oxide complex colloidal particles having a bonded structure of stannic oxide colloidal particles obtained by a reaction of metal tin, an organic acid and hydrogen peroxide with zirconium oxide colloidal particles at a $ZrO_2/SnO_2$ ratio of 0.02-1.0 based on weights of these oxides and having a particle diameter of 4-50 nm as nuclei, with tungsten oxide-stannic oxide-silicon dioxide complex colloidal particles having a $WO_3/SnO_2$ weight ratio of 0.1-100, a $SiO_2/SnO_2$ weight ratio of 0.1-100 and a particle diameter of 2-7 nm, and wherein the sol contains total metal oxides in an amount of 2-60% by weight, comprising the steps of:

(a) forming spherical stannic oxide colloidal particles having a particle diameter of 4-50 nm by reacting hydrogen peroxide solution with metal tin in an organic acid aqueous solution in such a manner that a molar ratio of $H_2O_2/Sn$ is maintained within a range of 2-4 and a concentration of tin oxides is 40% by weight or less;

(b) mixing a stannic oxide aqueous sol which contains the spherical stannic oxide colloidal particles having a particle diameter of 4-50 nm obtained in step (a) at a concentration of 0.5-50% by weight calculated as $SnO_2$, with an oxyzirconium salt aqueous solution having a concentration of 0.5-50% by weight calculated as $ZrO_2$, at a weight ratio of $ZrO_2/SnO_2$ of 0.02-1.0;

(c) forming a stannic oxide-zirconium oxide complex aqueous sol having a particle diameter of 4-50 nm by heating the mixed solution obtained in step (b) at 60-200° C. for 0.1-50 hours;

(d) forming a tungsten oxide-stannic oxide-silicon dioxide complex sol by preparing an aqueous solution containing tungstate, stannate and silicate in a $WO_3/SnO_2$ weight ratio of 0.1-100 and a $SiO_2/SnO_2$ weight ratio of 0.1-100 and removing cations present in the aqueous solution;

(e) mixing 100 parts by weight, calculated as the total of $ZrO_2$ and $SnO_2$ contained, of the stannic oxide-zirconium oxide complex aqueous sol obtained in step (c) with 2-100 parts by weight, calculated as total of $WO_3$, $SnO_2$ and $SiO_2$ contained, of the tungsten oxide-stannic oxide-silicon dioxide complex sol obtained in step (d) having a particle diameter of 2-7 nm, a $WO_3/SnO_2$ weight ratio of 0.1-100 and a $SiO_2/SnO_2$ weight ratio of 0.1-100 at 0-100° C.; and (f) removing anions present in the modified stannic oxide-zirconium oxide complex aqueous sol obtained in step (e) by bringing the sol into contact with an anion exchanger.

2. The method for preparing the stable sol according to claim 1, wherein the organic acid aqueous solution is an oxalic acid aqueous solution or an organic acid aqueous solution containing oxalic acid as a main component.

* * * * *